Figure 4:
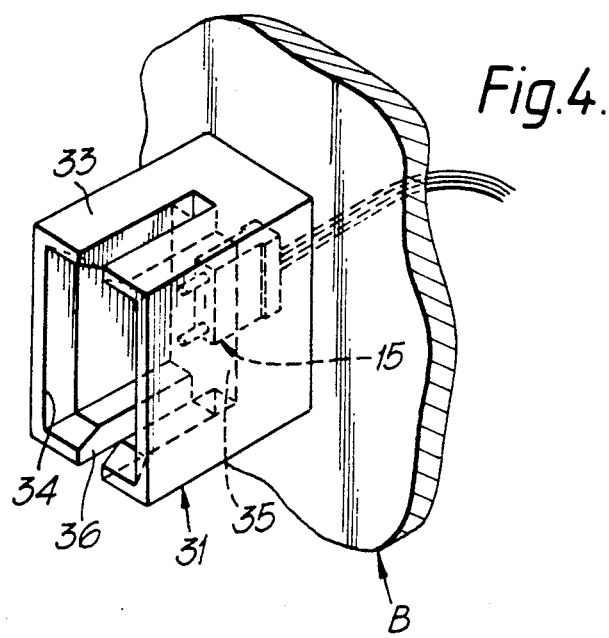

United States Patent
Knott

[11] Patent Number: 5,155,784
[45] Date of Patent: Oct. 13, 1992

[54] OPTICAL CONNECTION TO BACKPLANES

[75] Inventor: Michael P. Knott, Manchester, United Kingdom

[73] Assignee: Bicc plc, England

[21] Appl. No.: 784,969

[22] Filed: Oct. 30, 1991

[30] Foreign Application Priority Data

| Nov. 7, 1990 | [GB] | United Kingdom | 9024178 |
| Jun. 18, 1991 | [GB] | United Kingdom | 9112065 |
| Jun. 18, 1991 | [GB] | United Kingdom | 9113064 |

[51] Int. Cl.⁵ .......................... G02B 6/00; G02B 6/36
[52] U.S. Cl. ...................................... 385/88; 439/248
[58] Field of Search ................. 439/248, 249, 245; 385/88-92

[56] References Cited

U.S. PATENT DOCUMENTS

| 4,311,359 | 1/1982 | Keller | 385/88 |
| 4,362,360 | 12/1982 | Mannschke | 385/88 |
| 4,406,514 | 9/1983 | Hillegonds et al. | 385/88 |
| 4,645,295 | 2/1987 | Pronovost | 385/88X |
| 4,744,626 | 5/1988 | Mery | 385/88 X |
| 4,840,451 | 6/1989 | Sampson et al. | 385/88 X |
| 4,863,232 | 9/1989 | Kwa | 385/88 X |
| 4,863,233 | 9/1989 | Nienaber et al. | 385/89 |
| 4,993,803 | 2/1991 | Suverison et al. | 385/88 |
| 5,042,891 | 7/1991 | Mulholland et al. | 385/88 X |

Primary Examiner—Akm E. Ullah
Attorney, Agent, or Firm—Anthony J. Casella; Gerald E. Hespos

[57] ABSTRACT

Means for effecting a disconnectable optical connection between an optical guide carried by a circuit board and an optical guide carried by or associated with a backplane comprises in combination a two-part plug and socket mechanical connector and a two-part plug and socket optical fibre connector. One part of the mechanical connector is movable to a limited extent with respect to the backplane or circuit board on which it is carried and the other part of the mechanical connector is fixedly secured to a circuit board or to the backplane. One part of the optical fibre connector is housed in and fixedly secured with respect to the fixed part of the mechanical connector and the other part of the optical fibre connector is slidably mounted in and with respect to the movable part of the mechanical connector and is urged by a spring towards the mating end of the movable part of the mechanical connector. The optical connecting means can accommodate any play between a circuit board and the rack in which the circuit board is disposed.

14 Claims, 4 Drawing Sheets

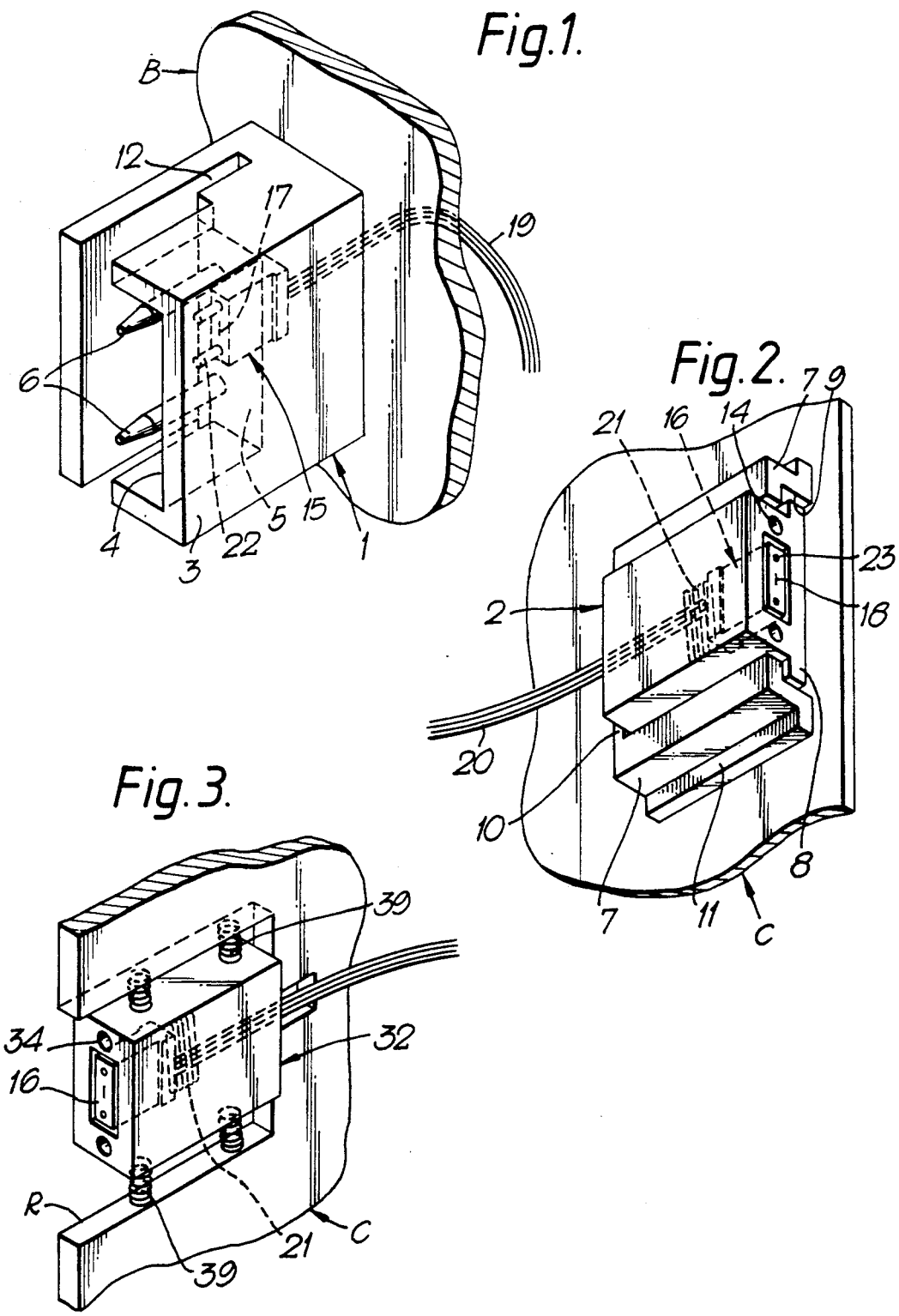

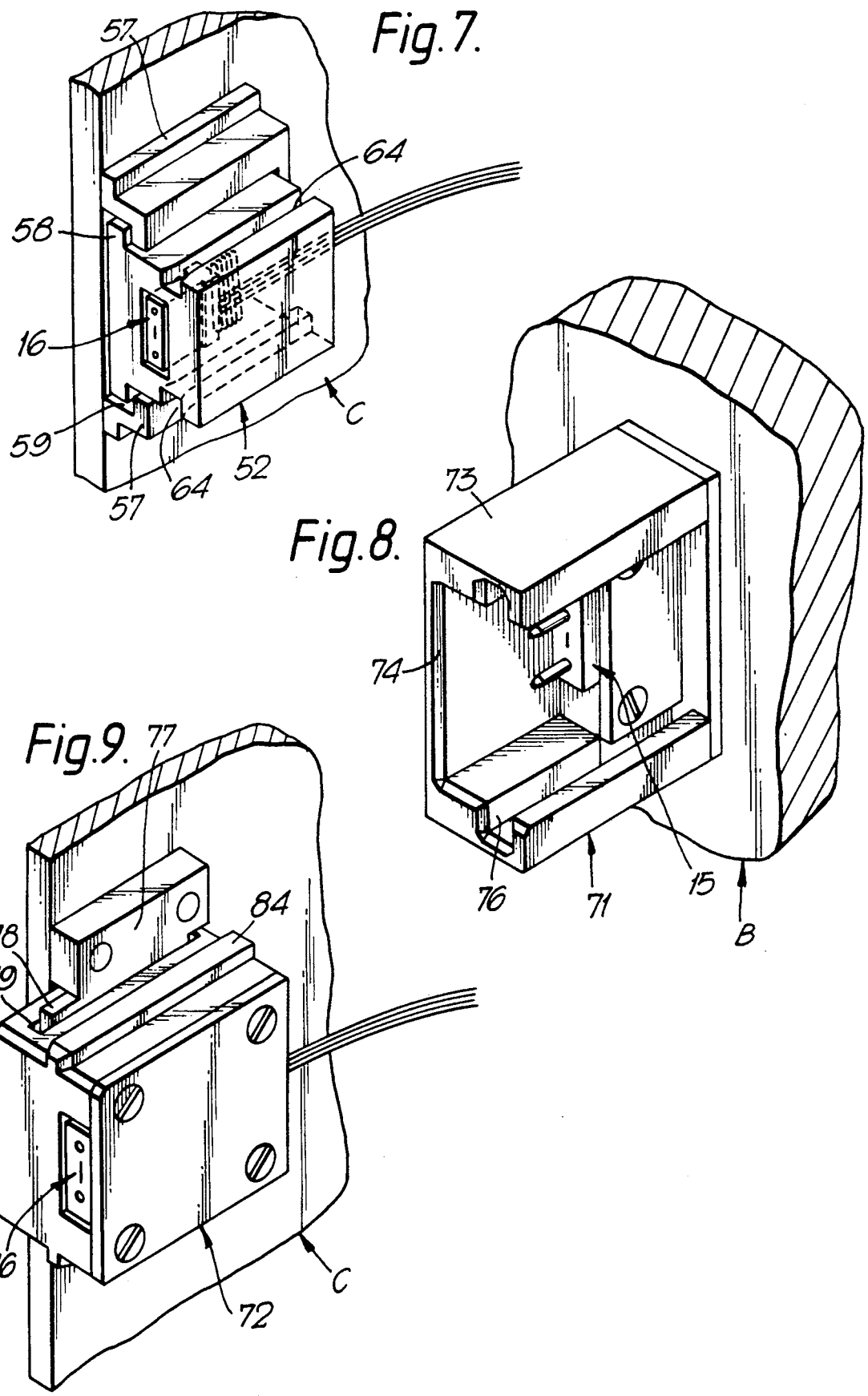

OPTICAL CONNECTION TO BACKPLANES

In complex electronic apparatus plurality of circuit boards arranged with their major faces lying in substantially parallel planes, it is the general practice to interconnect circuits of such boards by means of multi-circuits and associated connectors carried on a board, frequently referred to as a motherboard or backplane, to which edge connectors of said plurality of circuit boards are permanently or detachably connected. The circuit boards are generally removably accommodated with their major faces lying in substantially parallel planes in racks mounted in a housing and it is the custom to provide a degree of play between a circuit board and the rack in which it is accommodated to provide for ready insertion and removal of the board.

Whilst the provision of such play is acceptable where an edge connector carried by a circuit board is to effect interconnection between electric circuits carried on the circuit board and electric circuits carried by a backplane and/or by another circuit board or other circuit boards, the degree of such play makes it difficult to effect readily, by means of an optical edge connector carried by a circuit board and an optical connector carried by the backplane, an optical connection between an optical guide carried by or interconnected between devices on the circuit board and an optical guide carried by or interconnected between devices on the backplane and/or an optical guide carried by or interconnected between devices on another circuit board or other circuit boards.

It is an object of the present invention to provide improved means for effecting a disconnectable optical connection between an optical guide carried by or otherwise associated with a circuit board and an optical guide carried by or otherwise associated with a backplane, by which improved optical connection means such an optical connection can be effected with no more difficulty than hitherto experienced when effecting an equivalent electrical connection.

According to the invention, the improved optical connecting means comprises a two-part plug and socket mechanical connector, one body part of the mechanical connector being so mounted on the backplane or on a circuit board that said body part can move to a limited extent with respect to the backplane or circuit board in at least two rectilinear directions substantially normal to the axis of the connector and to one another and the other body part of the mechanical connector being fixedly secured to a circuit board or to the backplane or being so mounted on a circuit board or on the backplane that said other body part can move to a limited extent with respect to the circuit board or backplane in at least two rectilinear directions substantially normal to the axis of the connector and to one another; and an optical fibre connector comprising at least two separately formed mating body parts, each of which body parts has at least one substantially flat end face with which an end face of at least one optical fibre secured in said body part is substantially co-planar, one body part of the optical fibre connector being slidably mounted in and with respect to one body part of the mechanical connector with its axis substantially parallel to the axis of said body part of the mechanical connector and with its optical fibre or each of its optical fibres suitable for optical connection to or integral with an optical guide carried by or otherwise associated with the circuit board or backplane by which said body part of the mechanical connector is carried and being urged by resilient means housed in said body part of the mechanical connector in a rectilinear direction substantially parallel to said axes towards the mating end of said body part of the mechanical connector and the other or another body part of the optical fibre connector being housed in and fixedly secured with respect to the other body part of the mechanical connector with the axes of said body parts of said connectors substantially parallel to one another and with its optical fibre or each of its optical fibres optically connected to or integral with an optical guide carried by or otherwise associated with the backplane or circuit board by which said other body circuit board by which said other body part of the mechanical connector is carried or being slidably mounted in and with respect to said other body part of the mechanical connector with its axis substantially parallel to the axis of said other body part and with its optical fibre or each of its optical fibres suitable for optical connection to or integral with an optical guide carried by or otherwise associated with the backplane or circuit board by which said other body part of the mechanical connector is carried and being urged by resilient means housed in said other body part in a rectilinear direction substantially parallel to said axes towards the mating end of said other body part.

By virtue of the fact that the or each movable body part of the plug and socket mechanical connector is capable of limited movement with respect to the circuit board or backplane on which it is mounted in at least two rectilinear directions substantially normal to the axis of the connector and to one another, when an optical connection between the circuit board and the backplane is to be effected the or each movable body part can accommodate any play between the circuit board and the rack in which the circuit board is disposed. Furthermore, since at least one body part of the plug and socket optical fibre connector is slidably mounted in a body part of the mechanical connector with the axes of these body parts substantially parallel to one another, appropriate limited movement of one or each body part of the mechanical connector to effect a plug and socket connection with the other body part of the mechanical connector effectively axially aligns the body parts of the optical fibre connector.

Preferably, the optical fibre connector is a two-part plug and socket optical fibre connector.

Where, as is preferred, one body part of the plug and socket mechanical connector is fixedly secured to a circuit board or to the backplane, preferably one body part of a two part optical fibre connector is housed in and fixedly secured with respect to the fixed body part of the mechanical connector as above described. In this case preferably the fixed body part of the plug and socket mechanical connector is fixedly secured to the backplane and the body part of the optical fibre connector housed in and fixedly secured with respect to the fixed body part of the mechanical connector is removable from said fixed body part of the mechanical connector through a hole in the backplane in a rectilinear direction away from the mating end of said fixed body part of the mechanical connector. A supplementary body having a hole therethrough may be secured to the face of the backplane remote from the mating end of the fixed body part of the mechanical connector with its hole in axial alignment with the hole in the backplane, and said body part of the optical detachably secured in the hole of said supplementary body so that it protrudes into said fixed body part of the mechanical connector.

The end face of each body part of the two-part optical fibre connector may lie in a plane substantially normal to the axis of the optical fibre connector and, in this case, preferably the end face of the body part of the optical fibre connector housed in and fixedly secured with respect to the fixed body part of the mechanical connector lies in a plane substantially parallel to the major faces of the backplane and the end face of the body part of the optical fibre connector slidably mounted in and with respect to the movable body part of the mechanical connector lies in a plane substantially normal to the major faces of the circuit board.

The plug and socket connection between the body parts of the mechanical connector may take any convenient form. In one preferred embodiment, the plug and socket connection is effected by two substantially rigid pins protruding from the mating end of the fixed body part of the mechanical connector and transversely spaced on opposite sides of and in substantially the same plane as the central longitudinal axis of said fixed body part, which pins will engage in two correspondingly transversely spaced holes which open into the mating end face of the movable body part of the mechanical connector and which extend substantially parallel to and lie in substantially the same plane as the central longitudinal axis of said movable body part. In an alternative preferred embodiment, the movable body part of the mechanical connector itself effectively constitutes at least a part of a plug which is adapted to engage in a peripherally continuous or discontinuous shroud constituting the fixed body part of the mechanical connector. A third preferred embodiment of the plug and socket connection of the two-part mechanical connector incorporates a combination of the first and second preferred embodiments.

To provide for movement of the movable body part of the mechanical connector to a limited extent with respect to the circuit board or backplane on which it is mounted in at least two rectilinear directions substantially normal to the axis of the connector and to one another, the movable body part may be slidably mounted between a pair of transversely spaced guides carried on a major face of the circuit board or on a major face of the backplane, which guides are of such a form as to permit such limited movement in said two rectilinear directions and, to this end, the transversely spaced guides may be oppositely disposed longitudinally extending channels and the movable body part may have a pair of oppositely disposed longitudinally extending flanges which are slidable within the channels. Alternatively, the movable body part may be resiliently mounted in a recess in the rear edge of a circuit board by means of a plurality of coil springs or other resilient devices mutually spaced at intervals around a part of the periphery of the body part between the body part and parts of the circuit board bounding the recess.

The plug and socket connection between the two body parts of the optical fibre connector may also take any convenient form but, preferably, the fixed body part of the optical fibre connector has a pair of substantially rigid pins protruding from its mating end face substantially parallel to the central longitudinal axis of said fixed body part and disposed on transversely opposite sides of the optical fibre or optical fibres secured in the fixed body part, the pins and the optical fibre or fibres lying in a substantially common plane. In this case, the body part of the optical fibre connector slidably mounted in the movable body part of the mechanical connector has opening into its mating end face a pair of holes extending substantially parallel to the central longitudinal axis of the slidable body part and correspondingly transversely spaced on opposite sides of the optical fibre or optical fibres secured in the slidable body part, the pins and the optical fibre or fibres lying in a substantially common plane.

The end face of one or each body part of the optical fibre connector preferably is set back from the mating end face of the body part of the mechanical connector in which it is mounted to reduce risk of damage to the end face of the or each optical fibre. If desired, the set back end face of the or each body part of the optical fibre connector may be further protected by a spring loaded shutter which must be opened against the action of its spring to permit the body parts of the optical fibre connector to effect a plug and socket connection.

Although the two-part plug and socket mechanical connector may serve only as a means for accommodating play between a circuit board and the rack in which the circuit board is disposed, in some circumstances, the mechanical connector may additionally constitute an edge connector for effecting interconnection between electric circuits of a circuit board and electric circuits of the backplane. For example, the plug and socket connection between the two body parts of the mechanical connector may be constituted by a plurality of substantially rigid electric contact pins in one body part, preferably the fixed body part, which will effect electrical connection in a plurality of similarly disposed plated through holes or other electrically conductive sockets in the other body part of the mechanical connector.

Figure 5:
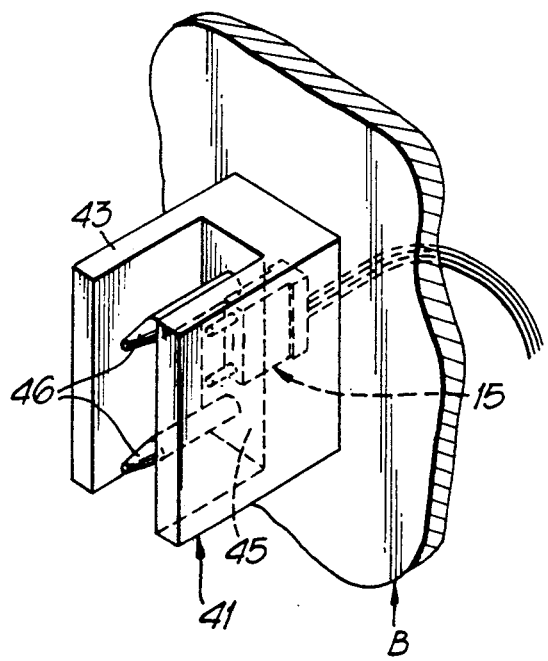
Figure 6:
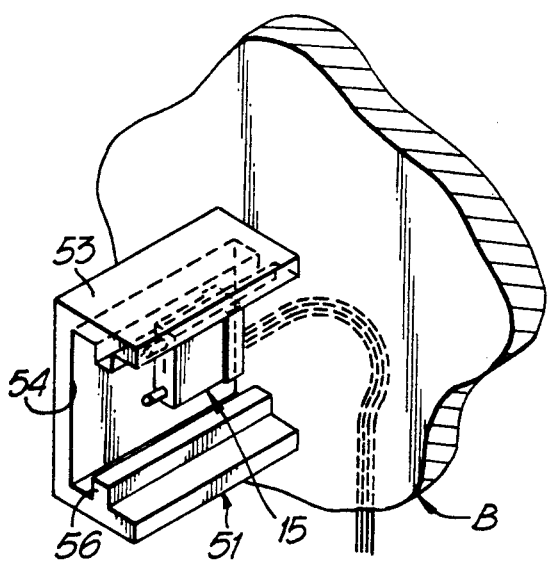
Figure 10:
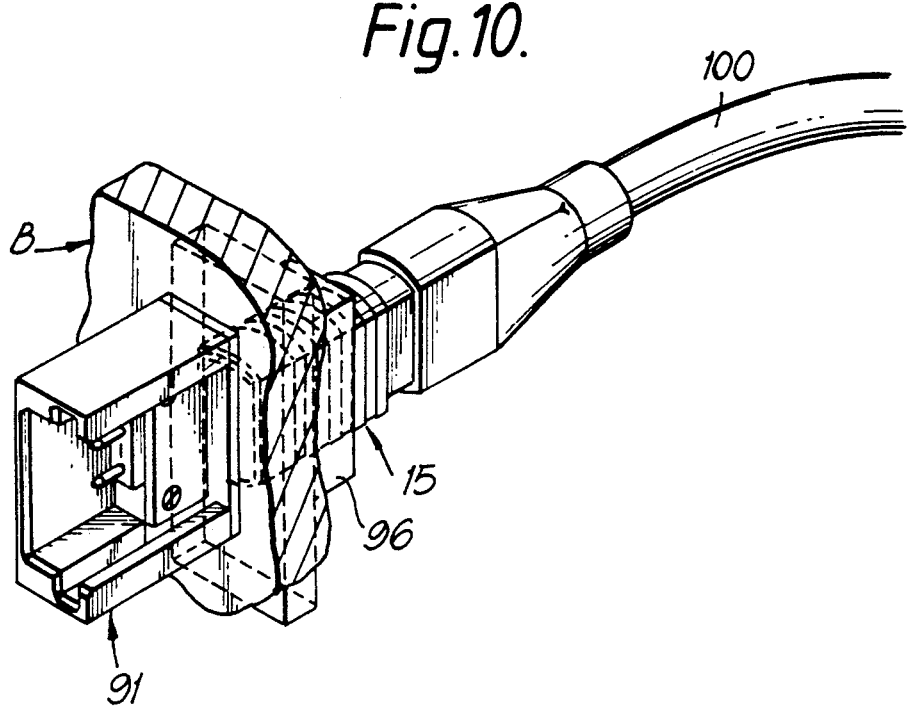
Figure 11:
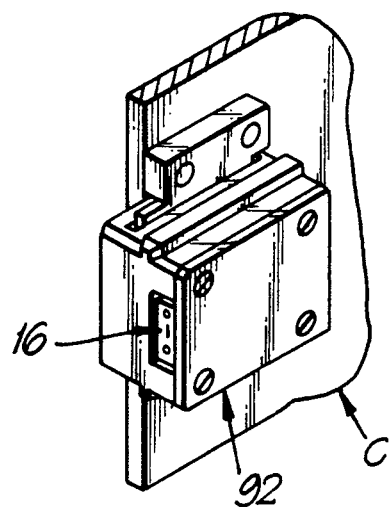

The invention is further illustrated by a description, by way of example, of six preferred means for effecting a disconnectable optical connection between an optical guide carried by a circuit board and an optical guide passing through or carried by a backplane, with reference to the accompanying drawings, in which:

FIGS. 1 and 2, respectively, show the fixed and movable body parts of a first preferred form of optical connecting means;

FIG. 3 shows the movable body part of second and third preferred forms of optical connecting means and FIGS. 4 and 5, respectively, show the fixed body parts of the second and third preferred forms of optical connecting means;

FIGS. 6 and 7, respectively, show the fixed and movable body parts of a fourth preferred form of optical connecting means;

FIGS. 8 and 9, respectively, show the fixed and movable body parts of a fifth preferred form of optical connecting means, and FIGS. 10 and 11, respectively, show the fixed and movable body parts of a sixth preferred form of optical connecting means.

In the first preferred form of optical connecting means shown in FIGS. 1 and 2, one body part 1 of a two-part plug and socket connector is fixedly secured to a backplane B and the other body part 2 of the mechanical connector is movably mounted on a circuit board C. The body part 1 is of substantially rectangular shape and comprises a peripherally discontinuous shroud 3 defining an opening 4 constituting a socket. Protruding from the end wall 5 of the body part 1 towards the open mating end of the socket 4 are two rigid pins 6 transversely spaced on opposite sides of the central longitudinal axis of the body part, the rigid pins and longitudinal axis lying in a common plane. The movable body part 2 is disposed between a pair of transversely spaced guides 7 mounted on the circuit board C and has a pair of oppositely disposed longitudinally extending flanges 8 which slide loosely within guide channels 9 defined by the guides 7, the extent of such sliding movement being limited by an end wall 10. The relative transverse dimensions of the guide channels 9 and flanges 8 are such that the movable body part 2 can move to a limited extent with respect to the circuit board C in at least two rectilinear directions normal to the axis of the connector and to one another, i.e. in a direction normal to the major faces of the circuit board and in a direction parallel to the major faces of the circuit board and normal to the axis of the connector. The guides 7 have a pair of oppositely disposed longitudinally extending flanges 11 which, together with the adjacent circuit board C, will slidably engage in a pair of slots 12 in oppositely disposed side walls of the shroud 3 of the fixed body part 1. The movable body part 2 has opening into its end face two holes 14 which are transversely spaced on opposite sides of the central longitudinal axis of the body part, the holes and longitudinal axis lying in a common plane, and in which the rigid pins 6 of the fixed body part 1 will slidably engage when the movable body part 2 is introduced into the socket 4 constituted by the shroud 3 of the body part 1 to effect a plug and socket connection.

One body 15 of a two-part plug and socket optical fibre connector is housed in and fixedly secured with respect to the fixed body part 1 of the mechanical connector with the axes of the body parts parallel to one another; the other body part 16 of the optical fibre connector is slidably mounted in a closed bore in the movable body part 2 of the mechanical connector with its axis parallel to the axis of the movable body part and is urged by a spring 21 housed in the closed end of the bore in a rectilinear direction parallel to the axes towards the mating end of the movable body part. Each body part 15, 16 of the optical fibre connector has a flat end face which lies in a plane normal to the axis of the body part and with which end faces of optical fibres 17, 18 secured in the body part are co-planar, the optical fibres 17 of the body part 15 being optically connected to optical fibres 19 carried by the backplane B and the optical fibres 18 of the body part 16 being optically connected to optical fibres 20 interconnected between devices (not shown) on the circuit board C. The fixed body part 15 of the optical fibre connector has a pair of rigid pins 22 protruding from its mating end face parallel to the central longitudinal axis of the fixed body part and disposed on transversely opposite sides of the optical fibres 17, the pins and optical fibres lying in a common plane; the slidable body part 16 of the optical fibre connector has opening into its mating end face a pair of holes 23 extending parallel to the central longitudinal axis of the slidable body part and correspondingly transversely disposed on opposite sides of the optical fibres 18, the holes and optical fibres lying in a common plane. The end faces of the body parts 15, 16 of the optical fibre connector are set back from the mating end faces of the body parts 1, 2 of the mechanical connector to reduce risk of damage to the end faces of the optical fibres 17, 18.

B virtue of the fact that the movable body part 2 can move to a limited extent with respect to the circuit board C in a direction normal to the major faces of the circuit board and in a direction parallel to the major faces of the circuit board and normal to the axis of the connector, when an optical connection between a circuit board and the backplane B is to be effected the movable body part 2 can accommodate any play between the circuit board and the rack in which the circuit board is disposed. Additionally, since the body part 16 of the optical fibre connector is slidably mounted in the body part 2 of the mechanical connector with the axes of these body parts parallel to one another, appropriate limited movement of the body part 2 to effect a plug and socket connection with the body part 1 effectively axially aligns the body parts 15, 16 of the optical fibre connector.

In each of the second to sixth preferred forms of optical connecting means to be described with reference to FIGS. 3 to 11, the form of the two-part plug and socket mechanical connector differs from the form of mechanical connector of each of the other preferred forms of optical connecting means but the forms of the two-part plug and socket optical fibre connectors of these preferred forms of optical connecting means and the manner in which the fixed and slidable body parts, respectively, of the optical fibre connectors are mounted in the fixed and movable body parts of the mechanical connectors are substantially identical to the fixed and slidable body parts of the optical fibre connector of the first preferred form of optical connecting means and to the manner in which they are mounted within the fixed and movable body parts 1, 2 of the mechanical connector as described with respect to and illustrated in FIGS. 1 and 2. Accordingly, for the sake of brevity and clarity, when describing the preferred forms of optical connecting means shown in FIGS. 3 to 11, the body parts of the optical fibre connectors thereof will not be described again in detail and, where appropriate, in respect of the optical fibre connectors the same numerical references will be used as those employed in FIGS. 1 and 2.

FIG. 3 illustrates the movable body part 32 of the two part plug and socket mechanical connectors of the second and third preferred forms of optical connecting means. The movable body part 32 is of substantially rectangular shape and has a closed bore in which one body part 16 of a two part optical fibre connector is slidably mounted and is urged by a spring 21 housed in the closed end of the bore towards the mating end of the movable body part. Opening into the mating end face of the movable body part 32 are two holes 34 which are transversely spaced on opposite sides of the central longitudinal axis of the body part, the holes and longitudinal axis lying in a common plane. The movable body part 32 is resiliently mounted in a recess R in the rear edge of a circuit board C by means of a plurality of coil springs 39 mutually spaced on each of two opposite sides of the body part between the body part and parts of the circuit board bounding the recess. The coil springs 39 provide for movement of the movable body part 32 to a limited extent with respect to the circuit board C in substantially any direction.

Referring to FIGS. 3 and 4, the second preferred form of optical connecting means includes a two-part plug and socket mechanical connector of which the movable body part 32 is as shown in FIG. 3 and the fixed body part 31 is as shown in FIG. 4. The fixed body part 31 fixedly secured to a backplane B is of rectangular shape and comprises a peripherally discontinuous shroud 33 defining an opening 34 constituting a socket.

A body part 15 of a two-part plug and socket optical fibre connector is fixedly secured in the end wall 35 of the body part 31 and in the backplane B. In oppositely disposed side walls of the shroud 33 are two blind slots 36 for accommodating the circuit board C when the movable body part 32 shown in FIG. 3 effects a plug and socket connection in the fixed body part 31.

Referring to FIGS. 3 and 5, the third preferred form of optical connecting means includes a two-part plug and socket mechanical connector of which the movable body part 32 is shown in FIG. 3 and the fixed body part 41 is shown in FIG. 5. The fixed body part 41 fixedly secured to a backplane B is of substantially channel-shape and comprises a base or end wall 45 and oppositely disposed side walls 43. A body part 15 of a two-part plug and socket optical fibre connector is fixedly secured in the base 45 and backplane B. Upstanding from the base 45 into the channel are two rigid pins 46 which are transversely spaced on opposite sides of the central longitudinal axis of the fixed body part 41, the pins and longitudinal axis lying in a common plane. When the movable body part 32 is slidably engaged between the side walls 43 of the fixed body part 41, the rigid pins 46 effect plug and socket connections in the holes 34 in the movable body part.

In each of the second and third preferred forms of optical connecting means, when an optical connection between optical guides associated with the circuit board C and the backplane B is effected, the movable body part 32, 42 will accommodate any play between the circuit board and the rack in which the circuit board is disposed whilst effecting a satisfactory optical connection between the optical fibres 17,18 of the body parts 15,16 of the optical fibre connection.

In the fourth preferred form of optical connecting means shown in FIGS. 6 and 7, the body part 51 of the mechanical connector fixedly secured to the backplane B comprises a peripherally discontinuous shroud 53 of approximately C-shaped cross-section defining an opening 54 constituting a socket and having, in oppositely disposed side walls of the shroud, a pair of inwardly protruding guide ribs 56. The movable body part 52 has a pair of oppositely disposed longitudinally extending flanges 58 which slide loosely within guide channels 59 defined by a pair of transversely spaced guides 57 mounted on the circuit board C in substantially the same manner as described with respect to the first preferred form of optical connecting means illustrated in FIGS. 1 and 2. In two oppositely disposed surfaces of the body part 52 is a pair of guide channels 64 into which the guide ribs 56 of the fixed body part 51 will slidably engage when the movable body part 52 is introduced into the socket 54 constituted by the shroud 53 to effect a plug and socket connection.

Referring to FIGS. 8 and 9, the body part 71 of the mechanical connector of the fifth preferred form of optical connecting means fixedly secured to the backplane B comprises a peripherally discontinuous shroud 73 of approximately C-shaped cross-section defining an opening 74 constituting a socket and having in the inner surfaces of two oppositely disposed side walls of the shroud a pair of guide channels 76. The movable body part 72 of the mechanical connector has upstanding from two oppositely disposed surfaces a pair of guide ribs 84 which will slidably engage in the guide channels 76 of the shroud 73 when a plug and socket connection is made between the fixed body part 71 and movable body part 72. Secured to the circuit board C adjacent the oppositely disposed surfaces of the movable body part 72 from which the guide ribs 84 upstand is a pair of transversely spaced guides 77 each having an inwardly directed, longitudinally extending tongue 78 which is a loose sliding fit in a groove 79 in the adjacent of said surfaces of the movable body part, the groove being closed at each of its ends. The relative transverse dimensions of the tongues 78 and grooves 79 are such that the movable body part 72 can move to a limited extent with respect to the circuit board C at least in a direction normal to the major faces of the circuit board and in a direction parallel to the major faces of the circuit board and normal to the axis of the connector.

In the sixth preferred form of optical connecting means shown in FIGS. 10 and 11, the fixed and movable body parts 91 and 92 and the manner in which, respectively, they are mounted on the backplane B and circuit board C are substantially identical to the arrangements described in respect of the fifth preferred form of optical connecting means illustrated in FIGS. 8 and 9. However, in this case, a supplementary body 96 is detachably secured to the face of the backplane B remote from the mating end of the fixed body part 91, the supplementary body having a hole therethrough in axial alignment with a hole in the backplane opening into the fixed body part, and the associated body part 15 of the optical fibre connector, optically connected to an end of an optical cable 100 associated with the backplane, is detachably secured in the hole of the supplementary body so that it protrudes into, and is fixedly secured with respect to, the fixed body part.

In each of the fourth, fifth and sixth preferred forms of optical connecting means, when an optical connection is made between optical guides associated with the circuit board C and backplane B, any play between the circuit board and the rack in which the circuit board is disposed will be accommodated whilst effecting a satisfactory optical connection between the optical fibres 17,18 of the body parts 15,16 of the optical fibre connector in substantially the same manner as in the other preferred forms of optical connecting means.

What I claim as my invention is:

1. Means for effecting a disconnectable optical connection between an optical guide carried by or otherwise associated with a circuit board and an optical guide carried by or otherwise associated with a backplane, which optical connecting means comprises a two-part plug and socket mechanical connector, one body part of the mechanical connector being so mounted on one of a group consisting of the backplane and a circuit board that said body part can move to a limited extent with respect to the backplane or circuit board in at least two rectilinear directions substantially normal to the axis of the connector and to one another and the other body part of the mechanical connector being fixedly secured to the other of said group consisting of a circuit board and the backplane; and a plug and socket optical fibre connector comprising two separately formed mating body parts, each of which body parts has at least one substantially flat end face with which an end face of at least one optical fibre secured in said body part is substantially co-planar, one body part of the optical fibre connector being slidably mounted in and with respect to one body part of the mechanical connector with its axis substantially parallel to the axis of said body part of the mechanical connector and with its optical fibre or each of its optical fibres optically connected to or integral with an optical guide associated with the circuit board or backplane by which said body part of the mechanical connector is carried and being urged by resilient means housed in said body part of the mechanical connector in a rectilinear direction substantially parallel to said axes towards the mating end of said body part of the mechanical connector and the other body part of the optical fibre connector being housed in and fixedly secured with respect to the other body part of the mechanical connector with the axes of said body parts of said connectors substantially parallel to one another and with its optical fibre or each of its optical fibres optically connected to or integral with an optical guide associated with the backplane or circuit board by which said other body part of the mechanical connector is carried.

2. Optical connecting means as claimed in claim 1, wherein one body part of the two-part optical fibre connector is housed in and fixedly secured with respect to the fixed body part of the mechanical connector.

3. Optical connecting means as claimed in claim 2, wherein the fixed body part of the plug and socket mechanical connector is fixedly secured to the backplane and the body part of the optical fibre connector housed in and fixedly secured with respect to the fixed body part of the mechanical connector is removable from said fixed body part of the mechanical connector through a hole in the backplane in a rectilinear direction away from the mating end of said fixed body part of the mechanical connector.

4. Optical connecting means as claimed in claim 3, wherein a supplementary body having a hole therethrough is secured to the face of the backplane remote from the mating end of the fixed body part of the mechanical connector with its hole in axial alignment with the hole in the backplane, and said body part of the optical fibre connector is detachably secured in the hole of said supplementary body and protrudes into said fixed body part of the mechanical connector.

5. Optical connecting means as claimed in claim 2, wherein the end face of each body part of the two-par optical fibre connector lies in a plane substantially normal to the axis of the optical fibre connector.

6. Optical connecting means as claimed in claim 5, wherein the end face of the body part of the optical fibre connector housed in and fixedly secured with respect to the fixed body part of the mechanical connector lies in a plane substantially parallel to the major faces of the backplane and the end face of the body part of the optical fibre connector slidably mounted in and with respect to the movable body part of the mechanical connector lies in a plane substantially normal to the major faces of the circuit board.

7. Optical connecting means as claimed in claim 2, wherein the fixed body part of the optical fibre connector has a pair of substantially rigid pins protruding from its mating end face substantially parallel to the central longitudinal axis of said fixed body part and disposed on transversely opposite sides of the optical fibre or optical fibres secured in the fixed body part, the pins and the optical fibre or fibres lying in a substantially common plane, and the body part of the optical fibre connector slidably mounted in the movable body part of the mechanical connector has opening into its mating end face a pair of holes extending substantially parallel to the central longitudinal axis of the slidable body part and correspondingly transversely spaced on opposite sides of the optical fibre or optical fibres secured in the slidable body part, the pins and the optical fibre or fibres lying in a substantially common plane.

8. Optical connecting means as claimed in claim 1, wherein the end face of at least one body part of the optical fibre connector is set back from the mating end face of the body part of the mechanical connector in which it is mounted.

9. Optical connecting means as claimed in claim 1, wherein the plug and socket connection between the body parts of the mechanical connector is effected by two substantially rigid pins protruding from the mating end of the fixed body part of the mechanical connector and transversely spaced on opposite sides of and in substantially the same plane as the central longitudinal axis of said fixed body part, which pins will engage in two correspondingly transversely spaced holes which open into the mating end face of the movable body part of the mechanical connector and which extend substantially parallel to and lie in substantially the same plane as the central longitudinal axis of said movable body part.

10. Optical connecting means as claimed in claim 1, wherein the movable body part of the mechanical connector itself effectively constitutes at least a part of a plug which is adapted to engage in a shroud constituting the fixed body part of the mechanical connector.

11. Optical connecting means as claimed in claim 2, wherein the movable body part of the mechanical connector is slidably mounted between a pair of transversely spaced guides carried on a major face of the circuit board, which guides are of such a form as to permit said limited movement of the movable body part in at least said two rectilinear directions.

12. Optical connecting means as claimed in claim 11, wherein said transversely spaced guides are oppositely disposed longitudinally extending channels and the movable body part of the mechanical connector has a pair of oppositely disposed longitudinally extending flanges which are slidable within the channels.

13. Optical connecting means as claimed claim 2, wherein the movable body part of the mechanical connector is resiliently mounted in a recess in the rear edge of a circuit board by means of a plurality of resilient devices mutually spaced at intervals around a part of the periphery of the body part between the body part and parts of the circuit board bounding the recess.

14. Optical connecting means as claimed in claim 1, wherein the two-part plug and socket mechanical connector additionally constitutes an edge connector for effecting interconnection between electric circuits of a circuit board and electric circuits of the backplane.

* * * * *